PRIOR ART Fig.1

| United States Patent Office | 3,524,032 |
|---|---|
| | Patented Aug. 11, 1970 |

3,524,032
COMBINATION STEERING WHEEL AND HORN FOR MOTOR CARS
Giovanni Conterno, Vedano Olona, Italy, assignor to Personal S.a.s., Milan, Italy, a company of Italy
Filed Jan. 29, 1969, Ser. No. 794,992
Claims priority, application Italy, Feb. 2, 1968, 7,853/68
Int. Cl. H01h 9/00
U.S. Cl. 200—61.54
9 Claims

ABSTRACT OF THE DISCLOSURE

A combination steering wheel and horn for motor vehicles is provided, in which the horn-actuating electric circuitry is located in the upper portion of the steering wheel hub. The lower portion of the hub contains only those component parts which are intended to fasten the hub to the steering shaft. Preferably, the size of the upper portion of the hub is standardized.

---

This invention relates to a steering wheel for motor vehicles incorporating a horn or, more particularly, a horn actuator, this term being intended to connote an assembly of pushbuttons, possibly connected to a ring, inserted in the spokes of the steering wheel to cause the actuation of the horn without removing the hands from the steering wheel rim.

Figure 1:
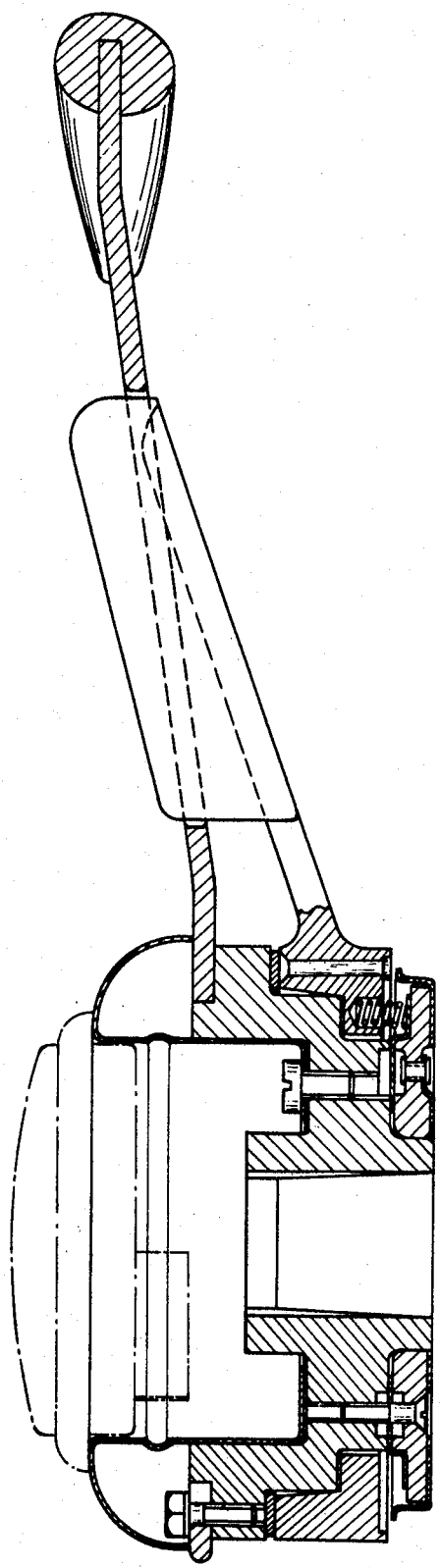

Devices of this kind as adopted heretofore are all similar to the one shown in FIG. 1, hereof and have the following drawbacks:

The hubs of different steering wheel models have different heights and diameters in the lower portions, so that it is necessary to provide a specific horn actuator for each kind of hub, the heights, slopes and diameters being varied since the contact device which controls the electric circuit is arranged in the lower portion of the hub (FIG. 1);

The three underlying arms of the steering wheel render the assembly heavy and give an impression of an unfinished and unsatisfactory construction;

The central portion of the steering wheel is, of necessity, fixed and cannot take advantage of the horn actuator mechanism.

An object of this invention is to overcome the shortcomings outlined above by providing a universal horn actuator mechanism which can thus be adapted to any kind of hub having standard sizes in the upper portion.

To this end, a combination steering wheel and horn for motor vehicles is provided, which is characterized in that the control mechanism for the horn is arranged in the upper portion of the wheel hub, the diameter of said upper portion being of a standard size, whereas the lower portion houses only the members intended to affix the hub to the steering wheel shaft.

Figure 2:
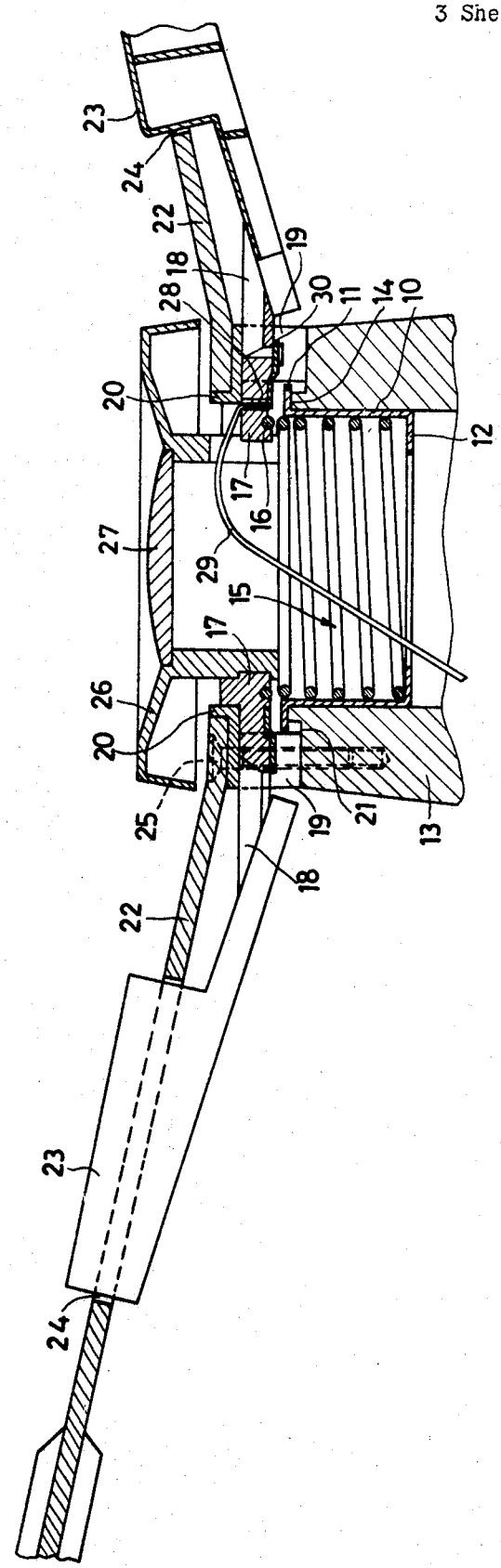
Figure 3:
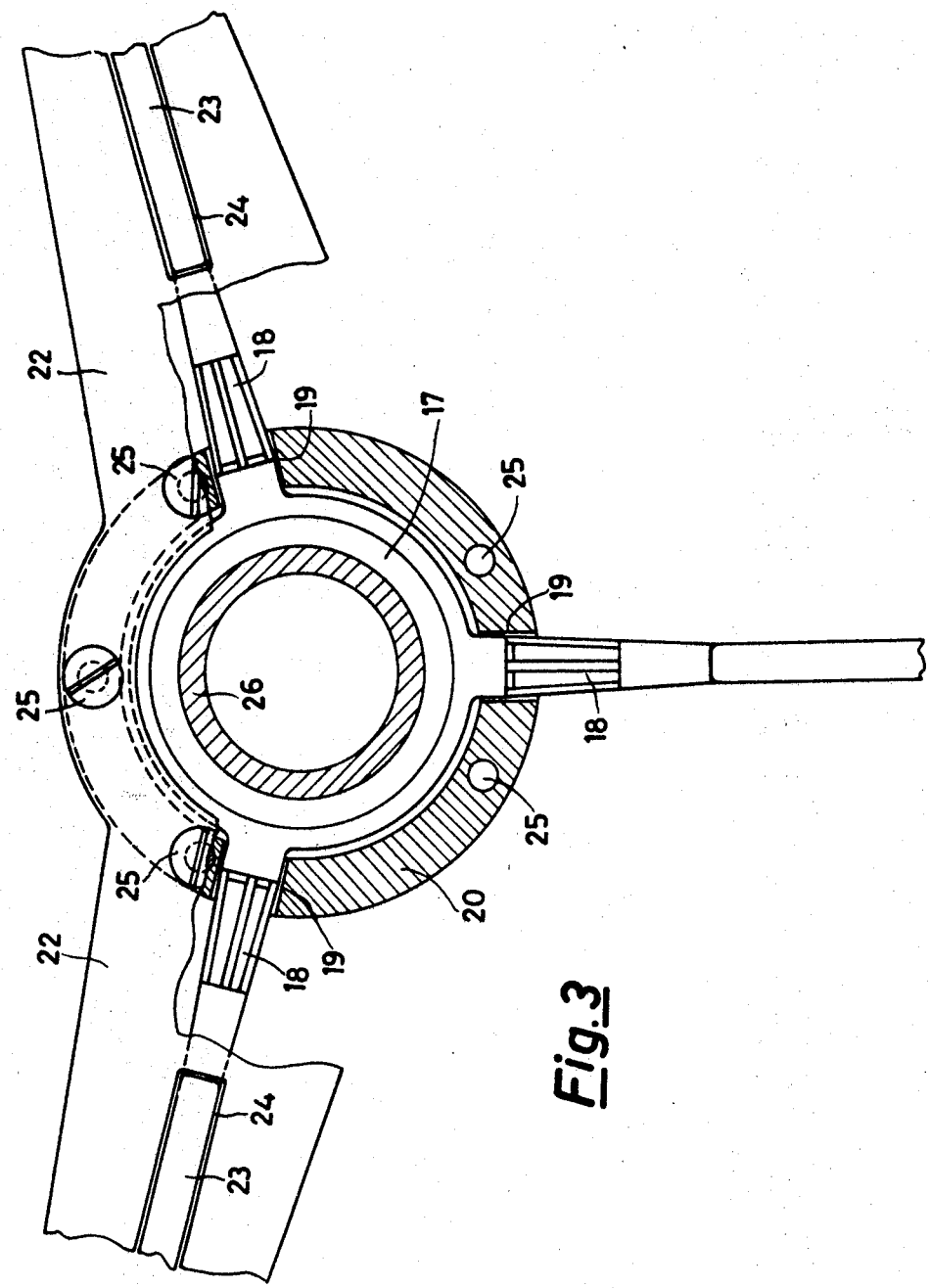

Now, a description of the subject invention will be given by way of nonlimiting example, reference being had to the accompanying drawings wherein:

FIG. 1 is a cross-sectional view of a known device;
FIG. 2 is a cross-sectional view of the "apparatus" according to the present invention, and
FIG. 3 is a plan view, partly in section, of FIG. 2.

The device comprises a tubular member 10, made of metal, for example brass, constructed in such a size as to match every kind of hub having its upper portion of standard size. The tubular member 10 has, along its entire circumference, and perpendicularly thereto, an outwardly extending upper rim 11, and an inwardly extending lower rim 12.

The member 10 is adapted to be inserted into the central bore of a hub 13 and to rest with its edge 11 against the upper edge 14 of the hub: a return spring 15, whose last upper convolution 16 projects above the upper edge 11 of the member 10, is inserted into member 10. On the uppermost convolutions 16 of spring 15 an annular core 17 is positioned, on the lowermost face of which a brass contact plate 30, also of annular shape is positioned.

From the outermost circumference of the core 17, three arms 18 radially protrude through three openings 19 formed on the side surface of a circular spreader 20 inserted between the edge 21 of the hub 13 and the spokes 22 of the steering wheel.

At the ends of the arms 18, three pushbuttons 23 are formed, which project from the surface of the spokes 22 in correspondence with three openings 24 formed thereon.

The spokes 22 are fastened to the hub 13 by means of screws 25 passed through the spreader 20.

At the inner rim of the core 17, a lid 26 is forcibly inserted, which is closed at its top by a cover 27 bearing the manufacturer's trademark or the like.

In addition, through the peripheral surface of the core 17 an opening 28 is formed to allow the passage for a metal cable 29, either end of which is connected to the contact plate 30, the opposite end being connected to an otherwise conventional electric circuitry to energize the horn proper.

The described device operates as follows:

By depressing the cover 27, the lid 26 and the core 17 connected thereto are depressed, and the metal plate 30 is brought into contact with the edge 11, thus completing an electric circuitry of conventional construction (not shown) to energize the motor vehicle horn.

When the pressure on the cover 27 is discontinued, the spring 15 restores the core 17 into contact with the spreader 20 by opening the aforementioned circuit, the horn energization being thus interrupted.

In addition, the horn can be actuated from three lateral positions, that is, without lifting the hands from the steering wheel rim and by depressing any of the pushbuttons 23, these, being united by the arms 18 to the core 17, bring the plate 30 into contact with the edge 11, thus completing the circuit in the manner already indicated above.

Such an embodiment affords a number of advantages which can be summarized as follows:

The device is universal, that is, it can be adapted to any kind of hub having its uppermost portion of standard size;

The horn can be actuated both by depressing the central cover and the lateral keys placed on the spokes, that is, without lifting a hand from the steering wheel rim, a fact which, under quite particular circumstances, could cause the vehicle to side-skid;

The device is constructionally so arranged that the steering wheel assembly has an attractive appearance.

What is claimed is:

1. Steering wheel apparatus comprising a lower hub element adapted for attachment to a steering shaft, and a self-contained assembly on said hub element, said assembly comprising a steering wheel and horn actuating mechanism, and means detachably securing said assembly as a removable unit on said hub element, the latter means providing transmission of rotation between said hub element and assembly.

2. Apparatus as claimed in claim 1, wherein said horn actuating mechanism comprises a first electrical contact member inserted within and supported on said hub element and a second displaceable contact member facing said first contact member to form a switch therewith.

3. Apparatus as claimed in claim 2, wherein said hub element has a central opening, said first contact member being tubular and inserted into said central opening, said first contact member including an outwardly extending rim at one end thereof resting on said hub element for contact with the displaceable contact member and an inwardly extending rim at the other end thereof; and spring means engaging said inwardly extending rim for urging the displaceable contact member away from said outwardly extending rim.

4. Apparatus as claimed in claim 2, wherein said steering wheel comprises spokes fixedly secured to said hub element by said securing means, said horn actuating mechanism comprising pushbuttons displaceably mounted in said spokes and means coupling said pushbuttons and displaceable contact member such that displacement of the pushbuttons produces displacement of the displaceable contact member.

5. Apparatus as claimed in claim 4, wherein said horn actuating mechanism further comprises a displaceable cover member connected with said means which couples the pushbuttons and displaceable contact member so that displacement of the cover member produces displacement of the displaceable contact member.

6. Apparatus as claimed in claim 5, wherein said means which couples the pushbuttons and the displaceable contact member comprises a displaceable core fixedly mounting said displaceable contact member, said pushbuttons being coupled with said core for common movement, said cover member being fixedly secured with said core, and spring means between said core and said first contact member to urge the contact members apart.

7. Apparatus as claimed in claim 6, wherein said hub element has a central opening, said first contact member being tubular and inserted into said central opening, said first contact member including an outwardly extending rim at one end thereof resting on said hub element for contact with the displaceable contact member and an inwardly extending rim at the other end thereof; said spring means engaging said inwardly extending rim and said core.

8. Apparatus as claimed in claim 7, wherein said assembly comprises a spreader secured to said steering wheel and hub element and inserted therebetween to provide a stop for said core.

9. Apparatus as claimed in claim 8, wherein said horn actuating mechanism comprises an electrical cable connected to one of said contact members and extending within the opening of the hub element for connection with an electrical source of energization.

References Cited

UNITED STATES PATENTS

| | | | |
|---|---|---|---|
| 2,894,090 | 7/1959 | Timoff et al. | 200—61.54 XR |
| 3,016,764 | 1/1962 | Fredericks et al. | 74—552 |

ROBERT K. SCHAEFER, Primary Examiner

M. GINSBURG, Assistant Examiner